Jan. 14, 1964     L. A. MORTENSEN     3,117,637
DRILL BIT
Filed Dec. 14, 1960
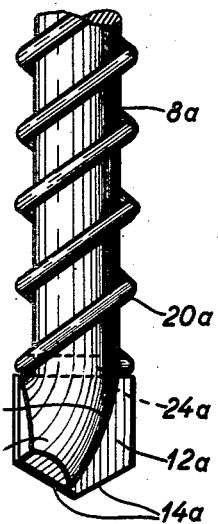
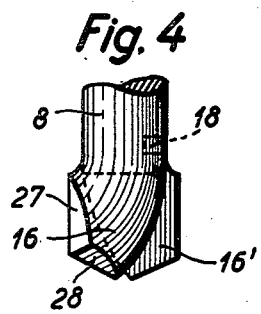
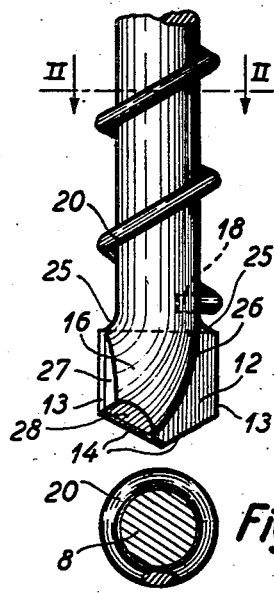
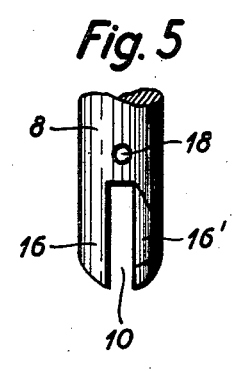
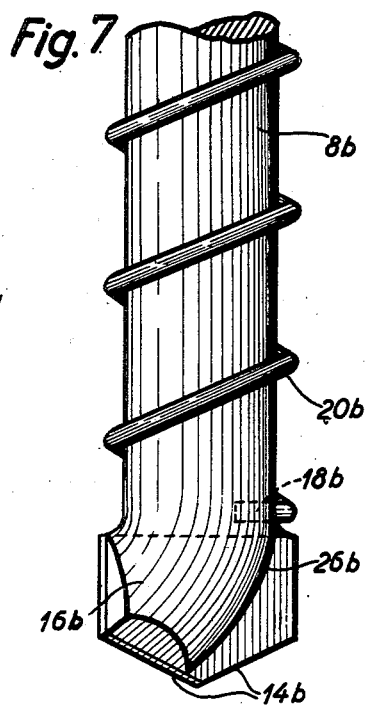
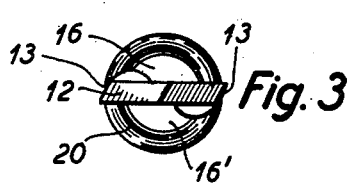
INVENTOR.
LOUIS AACKERSBERG MORTENSEN
BY
McGlew and Toren
ATTORNEYS United States Patent Office 3,117,637
Patented Jan. 14, 1964

3,117,637
DRILL BIT
Louis Aackersberg Mortensen, 196 Skodsborg Strandvej,
Skodsborg, Denmark
Filed Dec. 14, 1960, Ser. No. 75,808
Claims priority, application Denmark Nov. 1, 1960
2 Claims. (Cl. 175—394)

This invention relates in general to a drill bit construction and in particular to a new and useful wall drill having an improved cutting end and means for easily conducting boring dust outwardly through a hole as it is being drilled.

The present invention has particular reference to wall drills employed for such uses as boring in tile, clinker, concrete, ceramic and similar mineral materials.

The present invention is an improvement over prior art drill constructions particularly in the construction of the drill shank and cutting tool and the inclusion of means for easily carrying the dust that is produced by use of the drill out through the drilled hole. According to the invention the drill consists of a preferably cylindrical body having separated end portions between which is disposed a substantially flat diametrically extending cutting edge. The transverse or diametrical measurement of the cutting edge member is larger than the diameter of the drill body. The drill body is surrounded with helical wire disposed at a pitch suitable for conducting dust material outwardly from the drilled hole as the drill is rotated during boring. The helical wire is arranged directly above the cutting edge member and disposed at a pitch which, through experience has indicated, will provide efficient removal of the dust material. The pitch, for example, may be equal to the winding diameter of the helical wire.

In some instances, however, it is preferable to connect cal wire is attached to the body by means connecting it throughout its length, for example, by hard-soldering along its length.

In some instances, however, it is preferable to connect the wire with the body along an area which is adjacent the cutting edge only and disposing the upper portion of the helical wire loosely around the drill body. This latter construction has a two-fold advantage in that it permits easier construction of the drill body and provides a means for conducting dust from the drilled hole which is sufficiently resilient to produce an improved capacity for conducting material out of the drilled hole. In such an embodiment it is only necessary that the wire be securely attached at the location adjacent the cutting edge member and this may be done by providing an opening in the drill body into which the end of the helical wire is inserted. The helical wire, of course, is advantageously made of a resilient material which generally retains its helically coiled outline but which may flex under loading conditions.

Accordingly it is an object of this invention to provide an improved drill construction.

A further object of the invention is to provide a drill having means for conducting dust material out of an opening which it is boring.

A further object of the invention is to provide an improved drill construction including a body portion having separated end portions at one end between which a transverse plate cutting tool is disposed.

A further object of the invention is to provide a drill having a body portion with a cutting edge at one end of slightly greater diametrical extent and including a helical wire disposed on the body portion above the cutting edge and extending upwardly along the body portion for conducting dust material away from the cutting edge.

A further object of the invention is to provide a drill having one end with two spaced clamping portions between which a cutting edge plate member is disposed and including curved wall means extending upwardly along the body portion from the cutting edge.

A further object of the invention is to provide a drill which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary side elevational view of a drill constructed in accordance with the invention;

FIG. 2 is a horizontal section taken on the line 2—2 of FIG. 1;

FIG. 3 is a bottom plan view of the cutting edge;

FIG. 4 is a fragmentary elevation of the lowermost part of the drill body with the cutting edge member removed;

FIG. 5 is a view similar to FIG. 4 taken from the right side thereof;

FIG. 6 is a fragmentary elevational view of another embodiment of the invention; and FIG. 7 is a fragmentary elevational view of a larger diameter wall drill similar to that indicated in FIG. 1.

Referring to the drawings in particular the invention embodied therein includes an elongated drill body made of cylindrical steel rod or similar material preferably a material capable of being tempered. A groove 10 is milled in the lowermost end of the rod body 8 and it defines branch portions 16 and 16' on each side thereof.

In accordance with the invention a flat plate cutting edge member generally designated 12 is attached to the body 8 by inserting it into the groove 10 and by affixing it in position therein, for example, by hard-soldering. The cutting edge member 12 is slightly wider than the body 8 and is advantageously made of a cutting metal material such as stellite, widia-metal or another sintered alloy. The cutting edge member 12 is a substantially rectangular plate and includes slightly diverging side edges 13, 13 and obliquely extending bottom cutting edges 14, 14. The branches 16 and 16' of the body portion 8 are bent in opposite directions to provide curved edge portions 25, at the upper edge of the plate 12, and 26 extending downwardly in a sweep from the top edge to the lower edge 14. Each branch 16 and 16' is provided with an oblique edge face 27 which is complementary to and is aligned with the cutting edge 13 of the plate 12. An oblique edge face 28 is formed on the lower end of the branches 16 and 16' and is complementary to, and overlies, one of the oblique cutting edges 14 of the cutting edge marker or plate 12. (See FIGS. 1, 3 and 4.)

In the embodiments indicated in FIGS. 1 to 5, the body portion 8 is provided with a radial hole 18 disposed adjacent the uppermost edge of the cutting edge member 12. A helically wound wire 20 is disposed around the body 8 with its lower end positioned in the hole 18 and secured therein. The helically wound wire 20 is wound with such a diameter that it is disposed loosely around the body 8 from its place of connection at 18 and extending upwardly therefrom. It should be appreciated, however, that the wire may be secured along its complete length if desired. The pitch of the winding of the wire 20 is not critical, but it may, for example, be chosen equal to the diameter of the winding. An uppermost end 22 of the wire 20 is advantageously placed in a plane normal to the axis of the drill.

The wire is inserted over the body 8 after it has been wound by pushing it downwardly from the top thereof until the lowermost end is aligned toward the hole 18. The wire is then inserted in the opening at this end and in some instances it is only necessary that the wire be thus secured without any further attachment. For such a purpose the opening 18 need be only slightly larger than the diameter of the wire and a press fit is not absolutely essential.

When drilling, the cutting edge member 12 is rotated with the body 8 and the curvature of the branch portions at 25 and 26 effects a gradual upward flowing of the dust material as it is formed due to the cutting. The dust thereafter flows in the duct formed by successive coils of the wire 20 and is transported very easily out of the hole thereby.

A feature of the construction is that the helical wire when loosely connected will start vibrating and insure the rapid and continuous transport of the dust material upwardly out of the hole being bored and without jamming or packing. Moreover, in heavy load conditions the spring wire 20 will periodically be tightened and its diameter reduced and the increased tightening will overcome the force of the pressure of the dust against the helical windings whereby the spring will snap back into its original shape and the dust will be thrown outwards from the drilled hole. For such an effect it is, of course, important that the wire 20 is wound so that it is placed loosely around the body 8 and the end inserted in the opening 18. The clearance between the wire and the body may be rather considerable without detrimental effects in other respects.

Because the dust is easily discharged from the wall by the use of a drill constructed in accordance with the invention, drilling under considerable pressure can be accomplished to effect quick advancing of the drill without inadmissible heating of the cutting edge. The drilling can proceed uninterruptedly to the desired depth even if this depth be considerable.

The external diameter of the helical wire 20 is advantageously made equal to or slightly smaller than the width of the plate 12 in order to insure that the wire does not become jammed against the walls of the hole being bored.

In FIG. 1 a single thread of wire 20 is indicated and this construction is manufactured very easily and produces a very desirable dust withdrawal effect. However, a double thread construction, such as indicated in FIG. 6, can also be used.

In FIG. 6 a spring wire 20a is provided with a diametrical part 24a which is disposed within the groove formed between branches 16a, and 16a′ which also receives the plate 12a which is disposed below the outermost edge of the diametrical portion 24a of, the ends of the wire 20a. From the ends of the diametrical part 24a the wire 20a are coiled upwardly in opposite directions around the body 8a the coils extending upwardly at the same pitch angle. The diametrical part 24a of the wire 20a is advantageously attached to the body 8a by hard-soldering in the same manner as the plate cutting edge member 12a.

In FIG. 7 a larger diameter drill body 8b is disclosed as a comparison with the drill body 8 in FIG. 1. It should be noted that the diameter of wire 20b is preferably not increased in the same proportion as the diameter of the body 8b. Experiments have proved that by changing the dimensions indicated to scale in FIG. 1 to that indicated on the same scale in FIG. 7 it is still possible to use the same size wire and achieve the same desirable results in dust removal.

In considering the embodiments in FIGS. 1, 6 and 7, it will be seen that the convex edge 26, 26a and 26b of the branches 16, 16′, 16a, 16a, and 16b, 16b extend substantially in the same oblique direction as the windings of the wire 20, 20a and 20b, respectively. This construction is for the transport of dust from the cutting edges 14, 14a and 14b upwardly to the lowermost part of the helical wire and with such a construction it is not necessary to grind special flutes in the body in order to carry away the dust from the cutting edges.

The drill indicated by the invention has a considerable strength. This is due to the fact that the circular body has a large diameter as compared with the drill diameter and that its basic shaped does not always have to be altered by processing since the body material can be cut from drawn or rolled steel rods which are common articles of manufacture. Furthermore, a very effective attachment of the cutting edge to the body may be easily obtained. The material for the helical wire may be chosen independently of the material for the body and the parts may be separately ordered and easily assembled if desired. The helical wire is advantageously made of a material which will produce a smooth surface to expedite the upward movement of the dust along the same, but it need not be limited to such materials.

It should be appreciated that the body may be of a shape other than cylindrical, such as a slightly conical configuration extending upwardly from the cutting edge. Other deviations from the shown embodiments are well within the scope of the invention, for example, proportions between the body diameter, cutting width and the wire diameter from those indicated and described in the specification may be made.

While specific embodiments of the invention have been shown and described in detail to illustrate the application of the invention principles, it will be understood that the invention may be embodied otherwise without departing from such principles.

What is claimed is:

1. A drill comprising a substantially cylindrical body portion, a groove extending inwardly from one end of said body portion and defining on each side thereof spaced branch portions integral with said body portion, a substantially rectangular cutting plate disposed in said groove between said branch portions, said cutting plate being wider than the diameter of said cylindrical body portion and having side edges and a bottom portion with two adjoining cutting edges defined thereon, said branch portions being angled edgewise in opposite radial directions to form supports for the laterally extending parts of said cutting plate, a helical wire wound on said body portion and having a diametrical substantially horizontal portion extending through said body portion adjacent said groove, said wire having coil portions extending upwardly from each side of said body from said horizontal portion with adjacent convolutions of said coil portions spaced axially.

2. A drill comprising a substantially cylindrical body portion, a pair of spaced oppositely extending curved branching portions formed integrally with said body portion which curve downwardly and laterally outwardly from one end of said body portion and are spaced apart to define a blade receiving groove therebetween, a substantially rectangular flat blade in the groove between said branch portions, said blade having at least one side and an adjacent lower edge with a cutting portion, one of said branch portions extending substantially to a respective side and lower edge of said blade, the other of said branch portions extending substantially to the other side and adjacent lower edge of said blade.

(References on following page)

References Cited in the file of this patent

UNITED STATES PATENTS

| | | |
|---|---|---|
| 2,425,132 | Stokes | Aug. 5, 1947 |
| 2,565,333 | Weidman et al. | Aug. 21, 1951 |
| 2,673,714 | Hargrave | Mar. 30, 1954 |
| 2,817,983 | Mossberg | Dec. 31, 1957 |
| 3,032,129 | Fletcher et al. | May 1, 1962 |

FOREIGN PATENTS

| | | |
|---|---|---|
| 345,922 | Great Britain | Apr. 2, 1931 |
| 423,647 | Great Britain | Feb. 5, 1934 |
| 736,423 | Great Britain | Sept. 7, 1955 |
| 836,034 | Great Britain | June 1, 1960 |
| 1,118,255 | France | Mar. 12, 1956 |